United States Patent
Noguchi

[11] Patent Number: 5,118,068
[45] Date of Patent: Jun. 2, 1992

[54] VIBRATION ISOLATOR

[75] Inventor: Takeshi Noguchi, Yokohama, Japan

[73] Assignee: Bridgestone Corporation, Tokyo, Japan

[21] Appl. No.: 639,412

[22] Filed: Jan. 10, 1991

Related U.S. Application Data

[63] Continuation of Ser. No. 492,298, Feb. 28, 1990, abandoned, which is a continuation of Ser. No. 260,676, Oct. 21, 1988, abandoned.

[30] Foreign Application Priority Data

Oct. 28, 1987 [JP] Japan ............... 62-272716

[51] Int. Cl.$^5$ ............... F16M 5/00; F16M 13/00
[52] U.S. Cl. ............... 248/562
[58] Field of Search ............... 248/562, 636, 632, 634, 248/635; 267/140.1–140.5, 35, 141.2; 180/312

[56] References Cited

U.S. PATENT DOCUMENTS

| | | |
|---|---|---|
| 4,535,976 | 8/1985 | Dan et al. . |
| 4,588,174 | 5/1986 | Konishi . |
| 4,605,207 | 8/1986 | Konishi . |
| 4,630,806 | 12/1986 | Dan et al. . |
| 4,728,086 | 3/1988 | Ishiyama et al. ............... 248/562 X |
| 4,749,173 | 6/1988 | Kanda ............... 267/140.1 |
| 4,787,609 | 11/1988 | Dan et al. ............... 248/636 X |
| 4,834,351 | 5/1989 | Freudenberg et al. ............ 267/140.1 |

FOREIGN PATENT DOCUMENTS

| | | |
|---|---|---|
| 3617787 | 11/1986 | Fed. Rep. of Germany . |
| 60-179542 | 9/1985 | Japan . |
| 60-184740 | 9/1985 | Japan . |
| 61-45131 | 3/1986 | Japan . |
| 62-224746 | 10/1987 | Japan . |
| 63-6248 | 1/1988 | Japan . |

Primary Examiner—Karen J. Chotkowski
Attorney, Agent, or Firm—Oliff & Berridge

[57] ABSTRACT

A vibration isolator in which an elastic body is stretched between inner and outer tubes connected to a vibration source and a vibration receiving member, respectively, and in which a pair of liquid chambers disposed on opposite sides of the inner tube communicate with each other through a restricted passage, and the vibration isolator has an intermediate tube provided between the inner and outer tubes and supported on the outer tube. The intermediate tube has a portion serving as a partition spaced apart from both the inner and outer tubes. One of the liquid chambers is formed between the partition and the elastic membranous member located outside the partition. Even if the inner and outer tubes are relatively displaced to a large extent, the relative dispalcement therebetween is limited by the contact between side inner and intermediate tubes.

19 Claims, 7 Drawing Sheets

VIBRATION ISOLATOR

This is a continuation of application Ser. No. 07/492,298 filed Feb. 28, 1990, now abandoned, which in turn is a continuation of application Ser. No. 07/260,676 filed Oct. 21, 1988, now abandoned.

BACKGROUND OF THE INVENTION

This invention relates to a bush type vibration isolator with an elastic body interconnected between inner and outer tubes.

In general, a vibration isolator which has an elastic body interconnected between inner and outer tubes is used for an engine mount, a cab mount or bushes of motor vehicles. The elastic body has a pair of liquid chambers which communicate with each other by a restricted passage in which liquid is contained. When vibrations occur, the liquid in one of the liquid chambers moves to the other chamber through the restricted passage and the vibrations are absorbed by the resistance to passage to the liquid.

It is possible to design this type of vibration isolator to enable the liquid pressure in the liquid chambers to be effectively changed in response to vibrations by disposing a pair liquid chambers on an opposite sides of the inner tube. In this bush type vibration isolator, however, the inner tube is generally placed eccentrically relative to the outer tube (e.g. Japanese Patent Laid-Open No. 224746/1987), the liquid chamber disposed in narrower space between the inner and outer tubes has a flat shape portion such that an elastic membranous member which forms a portion of a wall of this liquid chamber faces a side of the inner tube. Consequently, if an amplitude of vibration becomes large, this elastic membranous member contacts with the elastic body formed around disposed on a periphery of the inner tube, and durability of the elastic membranous member will inevitably reduced.

SUMMARY OF THE INVENTION

In view of the above facts, it is an object of the present invention to provide a bush type vibration isolator.

The present invention provides a vibration isolator in which an elastic body is disposed between inner and outer tubes, one connected to a vibration source and the other to a vibration receiving member and in which a pair of liquid chambers disposed on opposite sides of the inner tube communicate with each other via a restricted passage. The vibration isolator includes an intermediate tube provided between the inner and outer tubes and supported on the outer tube, and the intermediate tube has a portion which serves as a partition spaced apart from both the inner and outer tubes, and one of the liquid chambers is formed between the partition and the elastic membranous member located outside the partition.

In accordance with the present invention, even if the inner and outer tubes are relatively displaced to a large extent, the relative displacement therebetween is limited by contact between the inner tube and the partition portion of the intermediate tube. Therefore the elastic membranous member which constitutes a wall of the liquid chamber formed between the partition and the outer tube is not contacted with the elastic body fixed to the inner tube by the relative displacement between the inner and outer tubes. Accordingly, the durability of the vibration isolator is increased.

BRIEF DESCRIPTION OF THE DRAWINGS

FIG. 12 is a cross-sectional view taken along the line XIII—XIII of FIG. 12;

DESCRIPTION OF THE PREFERRED EMBODIMENTS

Figure 1:
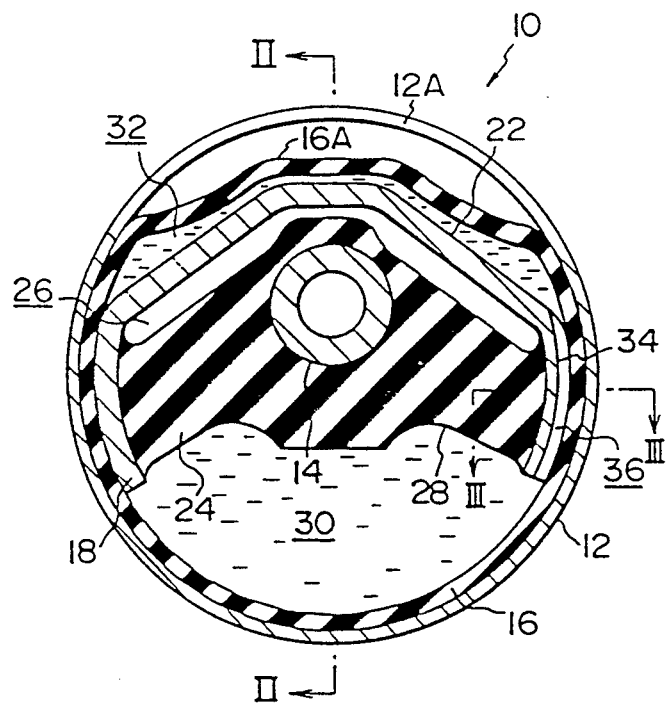
FIG. 1 is a cross-sectional view of a vibration isolator of a first embodiment according the present invention, taken along the line I—I of FIG. 2.
Figure 2:
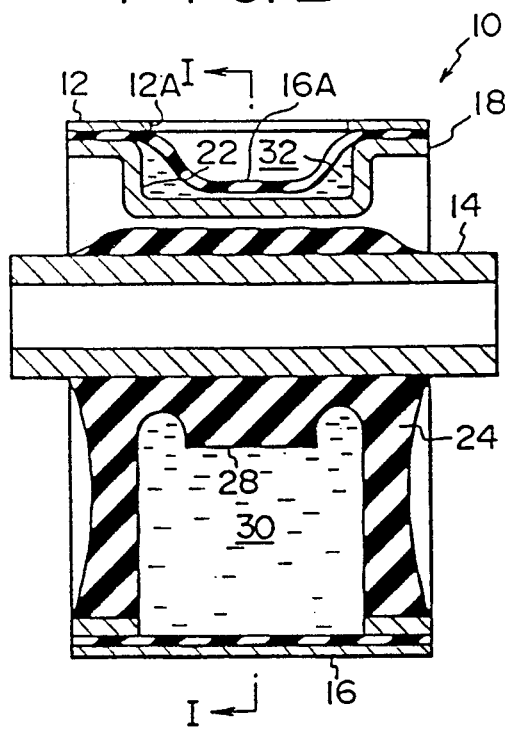
FIG. 2 is a cross-sectional view taken along the line II—II of FIG. 1.
Figure 3:
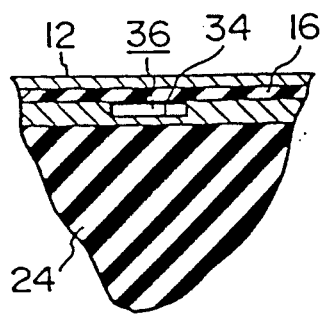
FIG. 3 is a cross-sectional view of a restricted passage taken along the line III—III of FIG. 1.

FIGS. 1 and 2 show a vibration isolator 10 which represents a first embodiment of the present invention in which an outer tube 12, and an inner tube 14 are disposed in such a manner that their axes are parallel to each other, one of the inner and outer tubes is connected to the body of a motor vehicle and the other is connected to the engine.

Figure 4:
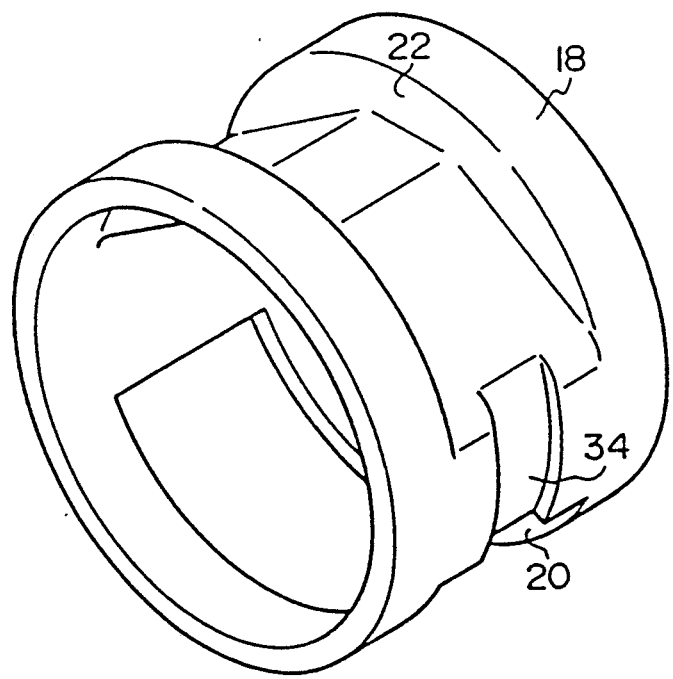
FIG. 4 is a perspective view of an intermediate tube of the first embodiment.

An intermediate tube 18 is disposed inside the outer tube 12 with an elastic membranous member 16 in the form of a tube interposed therebetween. The intermediate tube 18 has a small thickness, as shown in FIG. 4. A rectangular aperture 20 is formed in the circumferential direction in the intermediate tube 18, and a recessed portion 22 to be used as a partition is formed in the outer peripheral surface of the intermediate tube 18 in a position opposite to this aperture. When the intermediate tube 18 is fitted in the outer tube 12 through the elastic membranous member 16 the intermediate tube 18 and the outer tube 12 pinch the elastic membranous member 16 except the aperture 20 and the recessed portion 22. Preferably, the pinched portion of the elastic membranous member 16 is sulphurizedly bonded to the outer tube 12 or the intermediate tube 18.

An elastic body 24 is disposed between the inner tube 14 and the intermediate tube 18. A through opening 26 is formed between the elastic body 24 and the recessed portion 22. The elastic body 24 has a recess 28 formed on one side of the inner tube 14 opposite to the through opening 26, and a liquid chamber 30 is defined in which water, oil, ethylene glycol or the like is contained. The liquid chamber 30 is closed at the outer periphery of the elastic body 24 by the elastic membranous member 16.

The portion of the elastic membranous member 16 between the recessed portion of the intermediate tube 18 and the inner periphery of the outer tube 12 serves as a diaphragm 16A which is spaced from the outer tube 12 and which is disposed in a free state. As shown in FIG. 2, the diaphragm 16A is pinched between the intermediate tube 18 and the outer tube 12 at its ends opposite to each other in the direction of the axes of the tubes, thereby forming a liquid chamber 32 between the elastic membranous member 16 and the recessed portion 22.

The liquid chambers 30 and 32 communicate with each other through a groove 34 which is formed in the outer peripheral surface of the intermediate tube 18. The groove 34 defines a restricted passage 36 between itself and the elastic membranous member 16 when it is in an assembled state shown in FIGS. 1 and 2.

The outer tube 12 has an aperture 12A formed in a position corresponding to that of the diaphragm 16A, thereby facilitating the deformation of the diaphragm 16A. Alternatively, the diaphragm 16A may face the inner surface of an outer tube 12 which does not include an aperture 12A.

The operation of the present invention will be described below.

The inner tube 14 is connected to, for example, the body of a motor vehicle while the outer tube 12 is connected to the engine.

Vibrations of the engine are absorbed by the internal friction of the elastic body 24 and by the resistance to the liquid moving through the restricted passage 36 between the liquid chambers 30 and 32 when there is a difference in the liquid pressure in these chambers.

If the liquid pressure in the liquid chamber 32 increases, the diaphragm deforms elastically to allow the liquid chamber 32 to expand.

If the amplitude of vibration becomes large, a part of the elastic body 24 disposed around the inner tube 14 comes in contact with the recessed portion 22, and the relative movement between the outer tube 12 and the inner tube 14 is thereby limited. During this relative movement, however, there is no possibility of the elastic body 24 contacting the diaphragm 16A, thus preventing deterioration of the durability of the diaphragm 16A.

The portions of the elastic membranous member 16 other than the diaphragm 16A may be removed so long as there are suitable sealing properties of the connection between the intermediate tube 18 and the outer tube 12.

Figure 5:
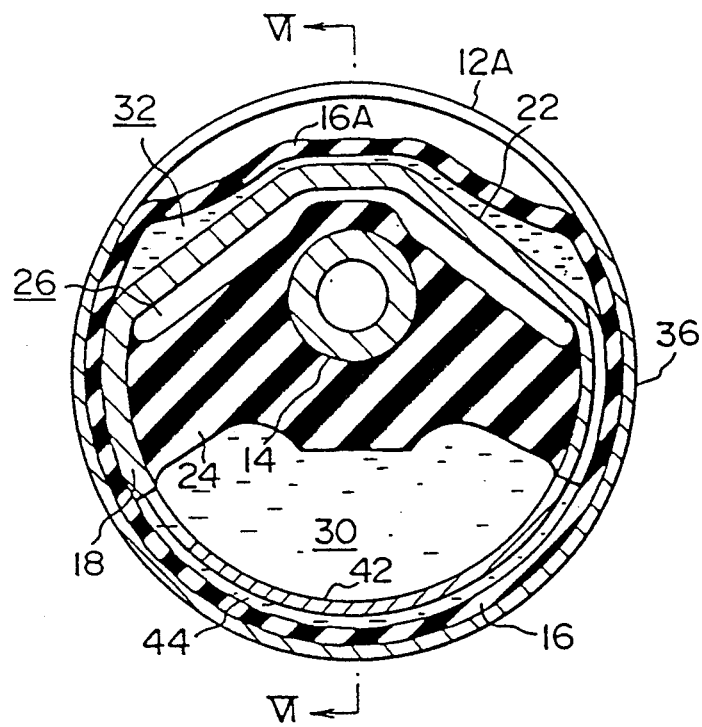
FIG. 5 is a cross-sectional view of a second embodiment of the present invention, corresponding to FIG. 1 and taken along the line V—V of FIG. 6.
Figure 6:
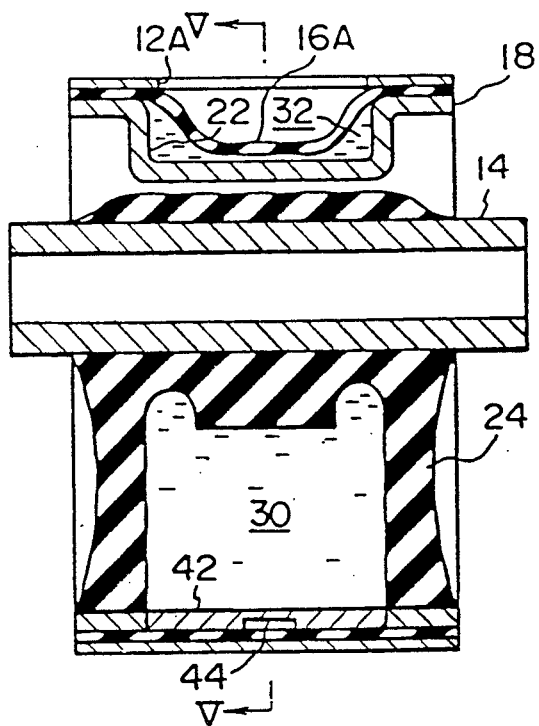
FIG. 6 is a cross-sectional view taken along the line VI—VI of FIG. 5.

FIGS. 5 and 6 show a second embodiment of the present invention which is constituted by providing a curved or bent plate 42 in the liquid chamber 30 of the arrangement of the first embodiment. The bent plate 42 is in the form of a circular arc and tightly fitted to the inner peripheral surface of the elastic membranous member 16. The bent plate 42 has a groove which is formed in its outer periphery and which defines a restricted path 44 between the outer periphery of the bent plate 42 and the elastic membranous member 16. The restricted path 44 communicates at its one end with the restricted passage 36 and at its other end with the liquid chamber 30.

In this embodiment, therefore, the restricted passage 36 is substantially elongated so as to obtain improved damping effects, thereby making it possible to rapidly absorb vibrations.

Figure 7:
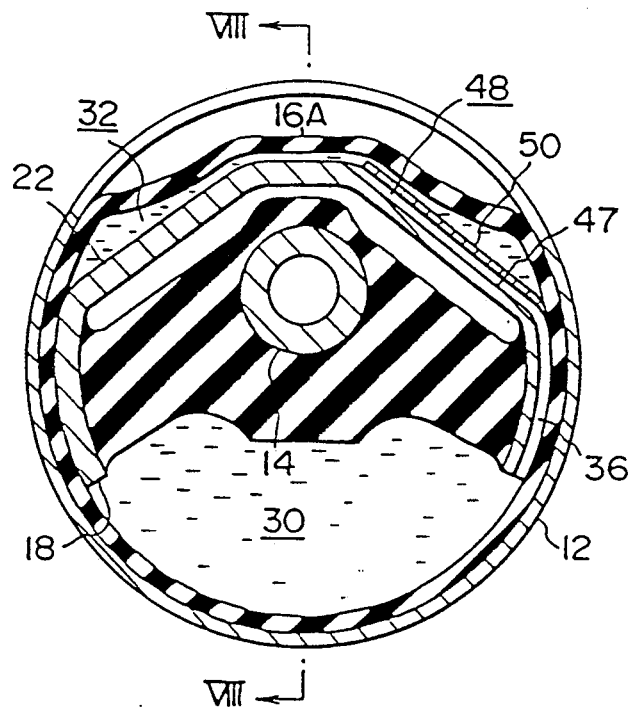
FIG. 7 is a cross-sectional view of a third embodiment of the present invention, corresponding to FIG. 1 and taken along the line VII—VII of FIG. 8.
Figure 8:
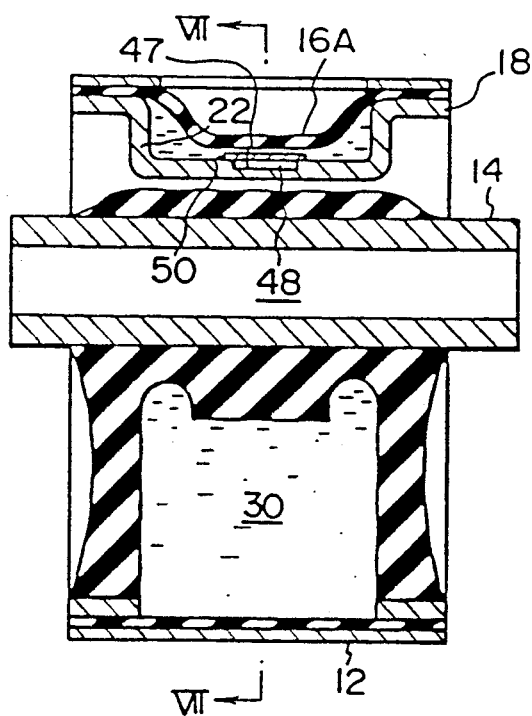
FIG. 8 is a cross-sectional view taken along the line VIII—VIII of FIG. 7.

FIGS. 7 and 8 show a third embodiment of the present invention which is constituted by providing a restricted passage 48 in the arrangement of the first embodiment. The restricted passage 48 is formed in such a manner that a groove 47 is formed in the surface of the recessed intermediate portion 22 facing the liquid chamber 32 of the first embodiment, and an abutment plate 50 is attached to this portion from the side of the liquid chamber 32. The restricted passage 48 communicates with its one end with the restricted passage 36 and with its other end with the liquid chamber 32, and the restricted passage 36 is substantially elongated, thereby obtaining the same effects as the second embodiment.

Figure 9:
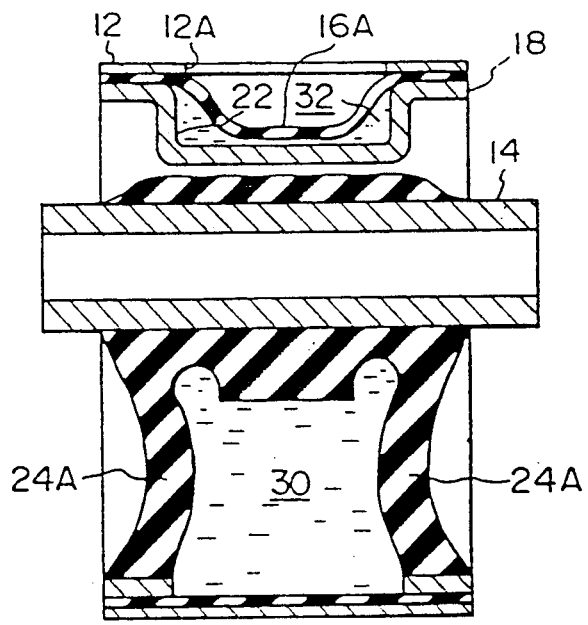
FIG. 9 is a cross-sectional view of a fourth embodiment of the present invention, corresponding to FIG. 2.

FIG. 9 shows a fourth embodiment of the present invention which is constructed in such a manner that, in the arrangement of the first embodiment, portions of the elastic body 24 forming opposite sidewalls 24A of the liquid chamber 30 are depressed such that the capacity thereof becomes reduced, and that the sidewalls 24A are closer to each other at its intermediate portions. If the pressure in the liquid chamber 30 increases as the inner tube is moved downward as viewed in FIG. 9, the sidewalls 24A become closer to each other, thereby promoting increase in the liquid chamber 30. As a result, the movement of the liquid in the restricted passage is promoted, and the vibration absorption effects are improved.

Figure 10:
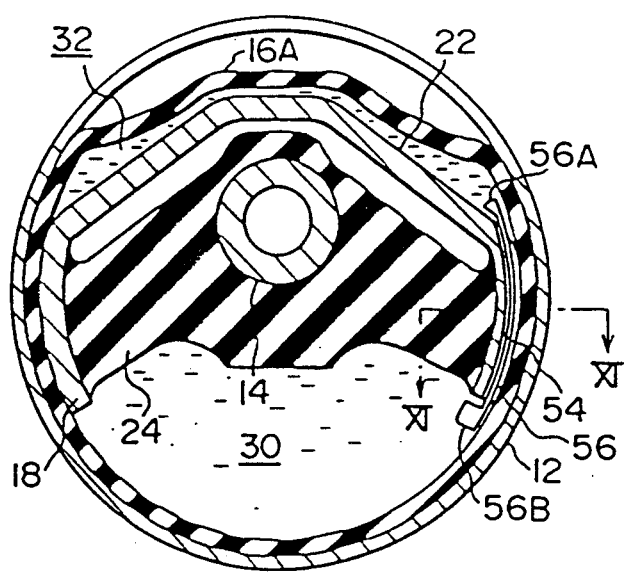
FIG. 10 is a cross-sectional view of a fifth embodiment of the present invention, corresponding to FIG. 1.
Figure 11:
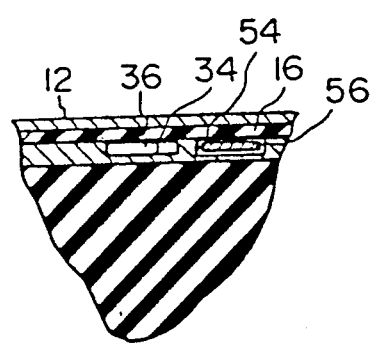
FIG. 11 is a cross-sectional view taken along the line XI—XI of FIG. 10.

FIGS. 10 and 11 show a fifth embodiment of the present invention which is constructed in such a manner that, a communication hole 54 is formed parallel to the restricted passage 36 in the arrangement of the first embodiment so as to provide communication between the liquid chambers 30 and 32, and a movable plate 56 is placed in the communication hole 54. Longitudinal ends of the movable plate 56 project into the liquid chambers 30 and 32. The longitudinal ends of the movable plate 56 is increased in size in diametral direction of the tubes, thereby forming extended portions 56A and 56B which function to limit the extent of movement of the movable plate 56 in the communication hole 54 in the longitudinal direction thereof.

In consequence, in this embodiment, the movable plate moves in the communication hole 56 in the longitudinal direction to limit the increase in the pressure in the liquid chamber 30 or 32 and keep the dynamic spring constant small when high-frequency vibrations occur such that the restricted passage 36 fail to allow the liquid chambers 30 and 32 to communicate with each other.

Preferably, an elastic material such as synthetic resin or rubber is selected to form the movable plate 56.

In this embodiment, the communication hole 54 and the restricted passage 36 are formed parallel to each other. However, it is possible to eliminate the need for the restricted passage 36 by providing a small hole which extends in the movable plate in the longitudinal direction thereof and which functions as the restricted passage. In this case, this means is not limited to the small hole formed through the movable plate 56. Instead, a groove is formed in the outer surface of the movable plate 56 through the overall longitudinal length thereof, or a groove may be formed in an inner surface portion of the communication hole 54, thereby enabling the liquid chambers to communicate with each other even when the movable plate is moved to one end of its stroke.

Figure 12:
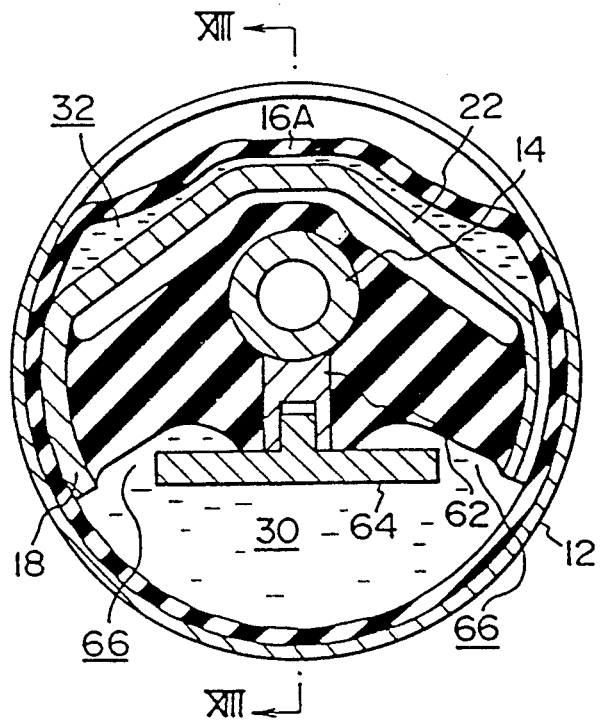
FIG. 12 is a cross-sectional view of a sixth embodiment of the present invention, corresponding to FIG. 1 and taken along the line XII—XII of FIG. 13.
Figure 13:
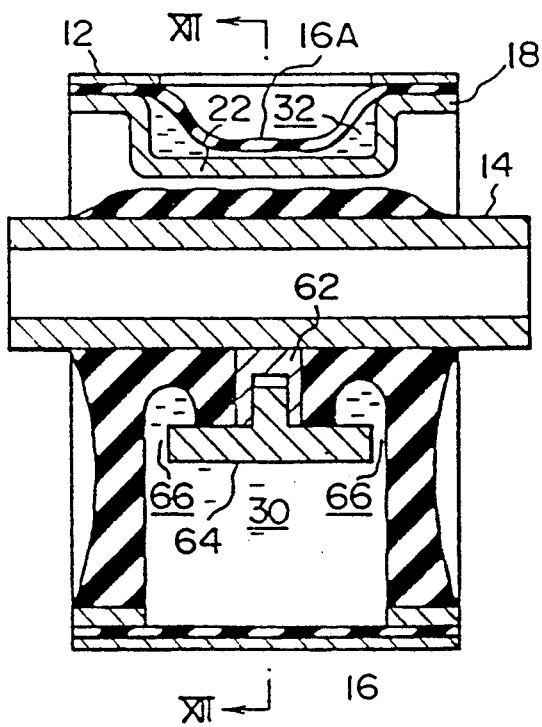

FIGS. 12 and 13 show a sixth embodiment of the present invention which is constructed in such a manner that, in the arrangement of the first embodiment, a support block 62 is fixed to the inner tube 14; and a wing 64 in the form of a disk or a rectangular plate is fixed to the support block 62. The wing 64 is located in the liquid chamber 30 such that liquid column resonance regions 66 are formed between the outer periphery of the wing 64 and the inner surface of the liquid chamber 30. The liquid column resonance regions are defined by gaps which have a sectional area greater than that of the restricted passage 36. In the case where restricted path 36 fails to establish suitable communication when high-frequency vibration occurs, the high frequency vibrations are observed by the resonance of the liquid in the liquid column resonance regions.

The wing 64 is also capable of functioning as a stopper to limit movement of the inner tube 14 when the inner tube 14 moves downward as shown in FIGS. 12 and 13 to a great extent relative to the outer tube 12.

Figure 14:
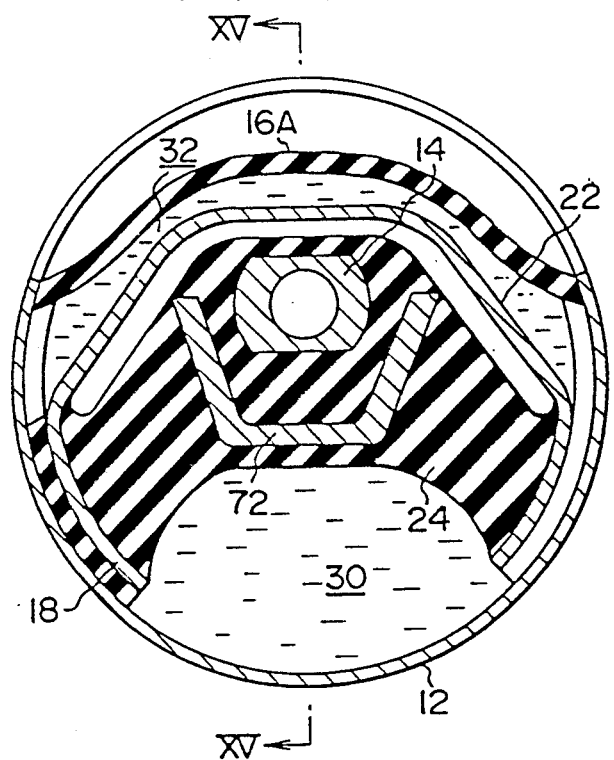
FIG. 14 is a cross-sectional view of a seventh embodiment of the present invention, corresponding to FIG. 1 and taken along the line XIV—XIV of FIG. 15.
Figure 15:
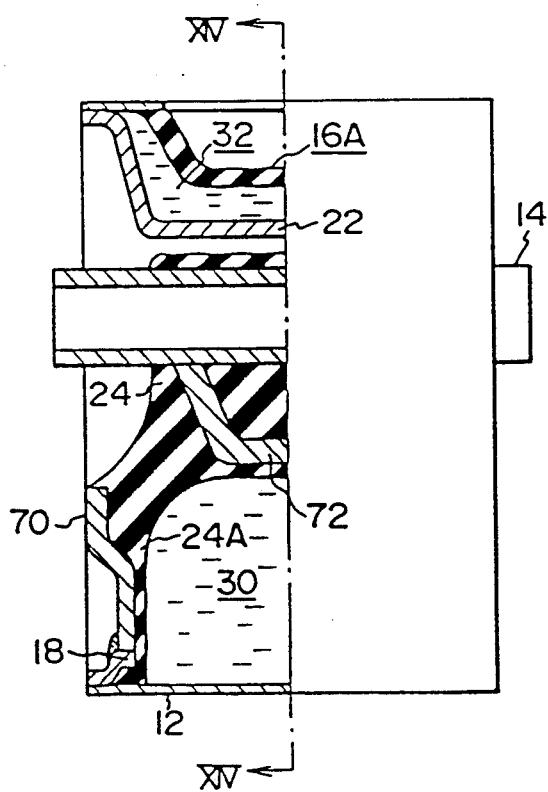
FIG. 15 is a cross-sectional view taken along the line XV—XV of FIG. 14.

FIGS. 14 and 15 show a seventh embodiment of the present invention in which, as shown in FIG. 15, the side walls 24A of the liquid chamber 30 are cure-bonded to side plates 70 fixed to the intermediate tube 18 and are thus supported on the outer tube 12. Consequently, the elastic body 24 is generally deformed by shearing forces and it becomes not liable to buckle, and durability is increased.

This embodiment also includes a reinforcement plate 72 which is embedded in the elastic body 24.

The above described embodiments may be modified to combine the above specific structures.

As described above, the present ensures an increase in the durability of the portion of the elastic membranous member that defines the liquid chamber placed on one side of the inner tube.

What is claimed is:

1. A vibration isolator interposed between a vibration source and a vibration receiving member, comprising:
    a first tubular member connected to one of said vibration source and said vibration receiving member;
    a second tubular member, an inner periphery of which faces an outer periphery of said first tubular member, said second tubular member being connected to the other one of said vibration source and said vibration receiving member;
    a third tubular member positioned between said first and second tubular members, said third tubular member having a partitioning portion spaced apart from both said first and second tubular members;
    an elastic body positioned between said first and third tubular members such that said first tubular member is connected to said third tubular member through said elastic body;
    an elastic membranous member having a diaphragm located outside said partitioning portion of said third tubular member; and
    first and second liquid chambers formed inside said second tubular member on opposite sides with respect to said first tubular member, said liquid chambers communicating with each other through a restricted passage, said first liquid chamber being defined by a substantially undeformable wall, and an elastic wall defined by said elastic body so as to allow said first liquid chamber to expand and contract by means of the deformation of said elastic body, and said second liquid chamber being formed between said partitioning portion of said third tubular member and said diaphragm of said elastic membranous member so as to allow said second liquid chamber to expand and contract by means of the deformation of said diaphragm, said elastic wall defined by said elastic body being the only substantially elastically deformable portion of said first liquid chamber, said diaphragm of said elastic membranous member being the only substantially elastically deformable portion of said second liquid chamber.

2. A vibration isolator according to claim 1, wherein said partitioning portion of said third tubular member comprises a recessed portion, said recessed portion being recessed toward said first tubular member.

3. A vibration isolator according to claim 2, wherein said second tubular member has an aperture located outside said second liquid chamber.

4. A vibration isolator according to claim 3, wherein said elastic membranous member is tubularly formed along the inner periphery of said second tubular member.

5. A vibration isolator according to claim 4, wherein said restricted passage includes a first passage defined by a groove formed in an outer surface of said third tubular member in the circumferential direction thereof and a portion of said elastic membranous member covering said groove.

6. A vibration isolator according to claim 5, wherein said restricted passage includes a first extension passage which is connected to said first passage and is extended into one of said liquid chambers.

7. A vibration isolator according to claim 1, wherein said elastic body connects said first and second tubular members through said third tubular member.

8. A vibration isolator according to claim 1, wherein a space is formed between said first and third tubular members through the entire axial length thereof.

9. A vibration isolator according to claim 1, further comprising a communication hole extending parallel to said restricted passage and communicating between said first and second liquid chambers, and a movable plate disposed in said communication hole, said movable plate being movable in a direction of communication through said communication hole.

10. A vibration isolator according to claim 1, wherein a liquid column resonance region is formed in said first liquid chamber.

11. A vibration isolator according to claim 10, wherein a wing member is disposed in said first liquid chamber and is fixedly connected to said first tubular member so as to form said liquid column resonance region in said first chamber together with said first liquid chamber, and said wing member acts as a stopper to limit movement of said first tubular member against said second tubular member.

12. A vibration isolator according to claim 1, further comprising a reinforcement member embedded in said elastic body to reinforce said elastic body from fatigue of said elastic body due to movement thereof.

13. A vibration isolator interposed between a vibration source and a vibration receiving member, comprising:
    an inner tube connected to one of said vibration source and said vibration receiving member;
    an outer tube which faces an outer periphery of said inner tube, and which is connected to the other one of said vibration source and said vibration receiving member;

an intermediate tube positioned between said inner and outer tubes, said intermediate tube having a partitioning portion spaced apart from both said inner and outer tubes;

an elastic body between said inner tube and said intermediate tube such that said inner tube is connected to said intermediate tube through said elastic body;

an elastic membranous member interposed between said intermediate and outer tubes, said elastic membranous member having a diaphragm spaced apart from both said intermediate and outer tubes and a tubular body disposed along an inner periphery of said outer tube, said elastic membranous member defining an expandable first liquid chamber between said tubular body thereof and a portion of said elastic body so as to allow said first liquid chamber to expand by means of the deformation of said elastic body, and defining an expandable second liquid chamber between said diaphragm thereof and said partitioning portion of said intermediate tube at an opposite side of said first liquid chamber with respect to said inner tube so as to allow said second liquid chamber to expand by means of the deformation of said diaphragm; and a restricted passage communicating between said first and second liquid chambers, said portion of said elastic body being the only substantially elastically deformable portion of said first liquid chamber, said diaphragm of said elastic membranous member being the only substantially elastically deformable portion of said second liquid chamber.

14. A vibration isolator according to claim 13, wherein a space is provided between said inner tube and said intermediate tube opposite to said first liquid chamber with respect to said inner tube, said space extending in an axial direction of said inner tube and being closed at both ends.

15. A vibration isolator according to claim 13, wherein said partitioning portion of said intermediate tube comprises an inwardly recessed portion.

16. A vibration isolator according to claim 15, wherein said outer tube has an aperture located outside said partitioning portion of said intermediate tube.

17. A vibration isolator according to claim 13, wherein said restricted passage is defined by a groove formed in an outer periphery of said intermediate tube in the circumferential direction thereof, and a portion of said elastic membranous member covers said groove.

18. A vibration isolator according to claim 13, wherein said inner tube is eccentrically disposed from an axis of said outer tube toward said second liquid chamber.

19. A vibration isolator having an inner tube and an outer tube connected to a vibration source and a vibration receiving member, respectively, an elastic body disposed between said inner and outer tubes, and a pair of liquid chambers oppositely disposed in relation to said inner tube and communicating with each other by a restricted passage, said vibration isolator comprising an intermediate tube provided around said inner and inside said outer tube, a portion of said intermediate tube forming a partitioning portion disposed apart from both said inner and outer tubes, an elastic membranous member being disposed at an outside portion of said partitioning portion, and one of said liquid chambers being formed between said partitioning portion and said elastic membranous member and the other liquid chamber being formed between said elastic body and said outer tube.

* * * * *